March 3, 1959 H. M. ROBINS 2,876,299

SIGNAL-TRANSLATING APPARATUS

Filed Aug. 29, 1956

HOWARD M. ROBINS
*INVENTOR.*

BY John J. Pederson

HIS ATTORNEY.

United States Patent Office 2,876,299
Patented Mar. 3, 1959

2,876,299

SIGNAL-TRANSLATING APPARATUS

Howard M. Robins, Chicago, Ill., assignor to Zenith Radio Corporation, a corporation of Delaware Application August 29, 1956, Serial No. 606,821

1 Claim. (Cl. 179—171)

Figure 1:
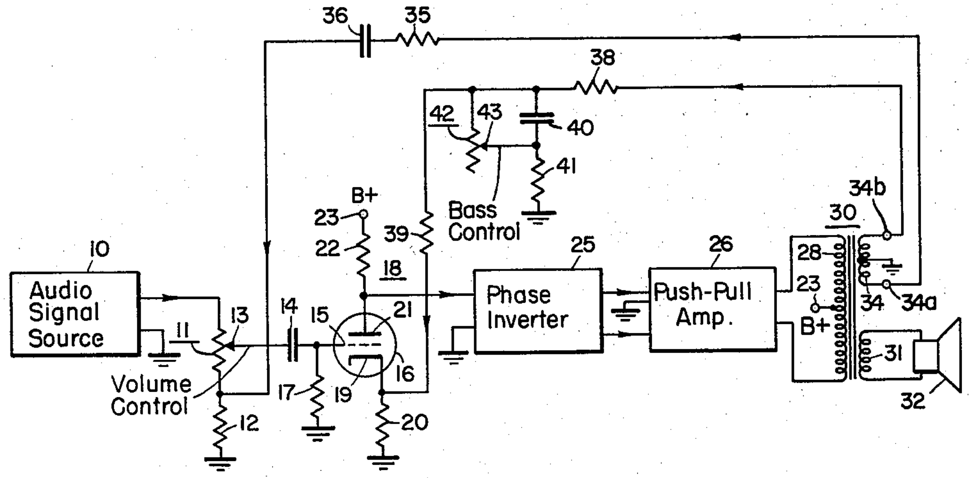

This invention relates in general to signal-translating apparatus; more particularly, it is addressed to a novel amplifying arrangement for use in broad band or high fidelity audio amplifying equipment.

In high fidelity audio amplifiers it is essential to provide a bass control to permit adjustment by the listener of the bass or low frequency response with respect to the treble response to achieve the balance most pleasing to the particular listener. A conventional and well known arrangement for providing a combination bass boost and bass control comprises the addition of a degenerative feedback circuit, including a series-connected condenser, from the output of a triode employed as a first amplifier back to its input. Usually, the volume control potentiometer and a series resistor are connected across the audio signal source, and the tap of the potentiometer is connected to the control grid of the triode. With such an arrangement, the degenerative feedback circuit is connected to the junction between the potentiometer and the fixed resistor. Since the series-connected condenser in the feedback circuit is frequency selective, the feedback potential varies with frequency, being greater at the high end of the audio range than at the low end. This has the effect of attenuating the middle and high portions of the audio range so that the bass frequency components are amplified out of proportion to the middle and treble components. In order to control this low frequency response, the condenser in the feedback circuit is often provided with a parallel-connected variable resistor that may be manually adjusted to vary the effect of the condenser on the degenerative feedback signal. When the condenser is shunted with a maximum of resistance there is considerably more attenuation or degeneration of the middle and high frequency components than the bass components because of the reactance of the condenser so that there is maximum bass boost, whereas when the condenser is shorted out the degeneration is constant throughout the audio range so that the feedback potential is essentially flat rather than varying with frequency.

While such an arrangement does provide a controlled bass boost there are certain disadvantages. For example, when the volume control potentiometer is set for maximum volume, the amplitude of the signal impressed on the amplifying triode is determined primarily by the audio signal source inasmuch as the entire output of the source is utilized; the feedback potential is actually negligible by comparison and thus even if that feedback potential is varied by means of a bass control resistor shunting the series condenser, it is still not possible to provide any noticeable bass control for maximum volume setting. Thus, with such a well known feedback arrangement a decrease in the bass response for maximum volume is not obtainable. This is a definite disadvantage since quite often excessive bass is heard and it cannot be eliminated without decreasing the volume for all of the audio signal components.

There is another disadvantage to this previous bass control circuit. The degenerative circuit is so connected between the output and the input of the amplifier that a signal of opposite phase is fed back so that there is actually a subtraction from the amplitude of the instantaneous input signal. This, of course, is true for any degenerative circuit. However, for some low frequency components there may be a sufficient phase shift in the amplifier that the feedback signal, which should be degenerative, actually may bring about regeneration for some volume control settings and cause substantially increased amplification, boost or "blurp" at certain points in the frequency response characteristic. Such regeneration can be removed sometimes by adjusting the bass control but at the expense of decreased bass boost; quite often it cannot be removed by any setting of the bass control.

The present invention is directed to the problem of overcoming the shortcomings of the described prior arrangement while still achieving bass boost and control. Accordingly, it is an object of the invention to provide new and improved audio signal-translating apparatus wherein the low-frequency response may be controlled for any level of the input signal.

It is a more specific object of the invention to provide a degenerative feedback arrangement for an amplifying apparatus which is supplied with an audio signal from the variable tap of a volume control potentiometer, wherein the degeneration is effective for any setting of the tap of the potentiometer.

Signal-translating apparatus, constructed in accordance with the invention, comprises a signal source which provides an audio signal having frequency components extending over a given audio range. A volume control potentiometer having a variable tap and a fixed resistor are connected in series across the source. An amplifying device is provided, having first and second input terminals and an output terminal, for amplifying the audio signal according to a substantially flat frequency response characteristic over the audio range. Another amplifying device is provided, having an input circuit and an output circuit; the output terminal of the first device is coupled to the input circuit of the other amplifying device. The tap of the potentiometer is coupled to one of the input terminals. Also included is a first feedback means for emphasizing the relatively low frequency components with respect to the middle and relatively high frequency components in the audio range. This first feedback means includes a series-connected condenser coupled from the output circuit of the other amplifying device to the junction between the fixed resistor and potentiometer for providing substantially degenerative feedback, varying with frequency, to effectively alter the frequency response characteristic of the first-mentioned amplifying device. The first feedback means is subject to introducing undesired regeneration for certain of the low frequency components in the audio range. The invention also includes second feedback means independent of the potentiometer for emphasizing the middle and relatively high frequency components in the audio range with respect to the relatively low frequency components and for effectively decreasing any undesired regeneration introduced by the first feedback means. The second feedback means includes a shunt-connected parallel combination of a condenser and a bass tone control resistor coupled from the output circuit of the other amplifying device to one of the input terminals for providing substantially degenerative feedback, varying with frequency, to effectively alter the frequency response characteristic of the first-mentioned amplifying device. The bass tone control resistor is variable to control the low frequency response of the first-mentioned device for any setting of the tap of the volume control potentiometer.

Figure 2:
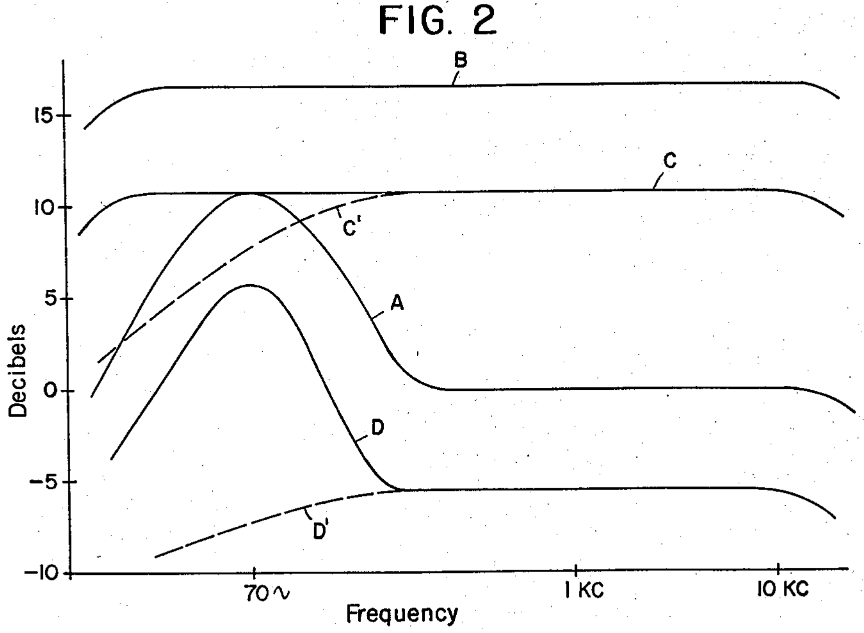

The features of this invention which are believed to be new are set forth with particularity in the appended claims. The invention, together with further objects and advantages thereof, may best be understood, however, by reference to the following description in conjunction with the accompanying drawings, in which:

Figure 1 illustrates a high fidelity audio amplifying system embodying the present invention; and, Figure 2 depicts various frequency response characteristics for different conditions of the amplifying arrangement of Figure 1.

Turning now to Figure 1, an audio signal source 10 has its output terminals connected across a volume control potentiometer 11 and a series-connected fixed resistor 12. The bottom terminals of source 10 and resistor 12 are grounded. The variable tap 13 of potentiometer 11 is connected through a series condenser 14 to the input electrode or control grid 15 of an electron-discharge device in the form of a triode 16 connected as an amplifier 18, grid 15 being returned to ground through a grid-leak resistor 17. Cathode or common electrode 19 of triode 16 is connected to ground through a cathode resistor 20 and output electrode or anode 21 of tube 16 is connected through a load resistor 22 to a source of B+ unidirectional potential 23. Anode 21 is coupled to the input circuit of a phase inverter 25 which in turn is connected to the input terminals of a push-pull amplifier 26. The output of amplifier 26 is connected to the center-tapped primary winding 28 of a transformer 30, the center tap being connected to B+ source 23. Secondary winding 31 of the transformer is connected to a speaker 32.

One terminal (bottom terminal 34*a* in the drawing) of a center-tapped secondary winding 34 of transformer 30 is connected through a series resistor 35 and condenser 36 to the junction between volume control potentiometer 11 and resistor 12. The center tap of winding 34 is connected to ground. Winding 34 is so wound that the potential developed at terminal 34*a* is in phase opposition with the audio signal from source 10 to provide degeneration. The feedback circuit from terminal 34*a* is of the type conventionally employed as discussed previously. The other terminal (top terminal 34*b* in the drawing) of winding 34 is coupled through series-connected resistors 38 and 39 to cathode 19 of triode 16. A shunt circuit consisting of a condenser 40 and a resistor 41 is connected between the junction of resistors 38, 39 and ground. A variable resistor 42 having a movable tap 43 is connected in parallel with condenser 40 in order to permit manual adjustment of the shunting effect of condenser 40. The phase of the potential developed at terminal 34*b* of winding 34 is opposite to that developed at terminal 34*a* and thus is in phase with the instantaneously applied signal from source 10. However, the feedback circuit from terminal 34*b* is connected to cathode 19 and thus an in-phase feedback signal is effective to degenerate a signal applied to grid 15.

In operation, neglecting for the moment the effect of the two feedback circuits from transformer winding 34, the audio amplifying system translates an audio signal in conventional fashion. An audio signal having frequency components extending over a given audio range is developed in source 10 from, for example, a phonograph pick-up, FM detector, microphone, etc., and is impressed across volume control potentiometer 11 and resistor 12. Variable tap 13 is adjusted by the listener to establish a pleasing volume level and thus a certain percentage of the output of source 10 is applied to grid 15 of tube 16 of amplifier 18 depending on the particular setting of the tap. Amplifier 18 is designed so that it amplifies substantially all of the frequency components over the audio range to deliver an amplified audio signal to phase inverter 25. The inverter supplies the amplified audio signal in opposite phase to the two input circuits of push-pull amplifier 26 which in turn further amplifies the signal without any substantial loss of frequency components to induce a high fidelity signal in transformer winding 31 which is reproduced in speaker 32.

In order to provide more amplification for the low or bass frequency components in the audio range, the feedback circuit from terminal 34*a* of winding 34 impresses a potential across resistor 12 which is of opposite phase to that of the instantaneously applied potential from source 10. Consequently, a subtraction is effectively made from the signal from source 10 and degeneration results. The series circuit of resistor 12, condenser 36 and resistor 35 effectively constitutes a voltage divider with the feedback voltage applied to grid 15 of amplifier 18 being picked or tapped off at the junction of resistor 12 and condenser 36. Since the reactance of condenser 36 varies with frequency (decreasing with frequency), the voltage drop of the feedback potential from terminal 34*a* across the relatively low reactance of condenser 36 for the middle and high frequency components in the audio range is small as compared to the voltage drop across condenser 36 for the bass components. A greater percentage of the feedback potential is dropped across resistor 12 and consequently there is more degeneration for the middle and high frequency components.

On the other hand, with respect to the translation of the relatively low or bass frequency components condenser 36 exhibits a relatively high reactance and the feedback potential is dropped primarily across that condenser, leaving a smaller percentage to be impressed across resistor 12. In this way, there is very little degeneration for the bass components which effectively results in a boost of such bass components with respect to the middle and treble components.

A typical frequency response characteristic of amplifier 18 obtained through the use only of the feedback circuit from terminal 34*a* for an intermediate setting of potentiometer 11, such as is illustrated in Figure 1, is shown as curve A in Figure 2. As discussed hereinbefore, this feedback circuit by itself is adequate for achieving bass boost; bass control may be realized by merely adding a variable resistor in shunt with condenser 36 in order to vary its effect. However, for a maximum setting of potentiometer 11, namely when tap 13 is at the top of the potentiometer, the magnitude of the feedback potential across resistor 12 is usually negligible compared to the audio signal from source 10 impressed across potentiometer 11 and 12 together, which is the signal applied to grid 15. Thus, amplifier 18 has a substantially flat frequency response characteristic as shown by curve B. Even though condenser 36 may be shorted out completely, the frequency response characteristic is still substantially that represented by curve B for maximum volume setting.

In accordance with the present invention, bass control is realized for all settings of volume control potentiometer 11 through the utilization of the additional feedback circuit from terminal 34*b* of winding 34. Here the feedback potential is effectively dropped across the voltage dividing arrangement of resistor 38, potentiometer 42, condenser 40 and resistor 41, the potential impressed on cathode 19 being tapped off at the junction between resistor 38 and the parallel combination of potentiometer 42 and condenser 40. In view of the fact that condenser 40 is effectively connected in shunt with the top half of winding 34, this degenerative circuit operates in reverse to that comprising reistor 35 and condenser 36 in that the potential applied to cathode 19 varies inversely with frequency. For high frequency components condenser 40 exhibits a relatively small reactance and thus a larger percentage of feedback potential is dropped across resistor 38 and the potential applied to cathode 19 is less than that resulting for the bass components. Thus, with the use of the feedback circuit from terminal 34*b* by itself, degeneration would be considerably more pronounced in the low end of the audio range than at the high end, giving rise to effectively a middle and high frequency boost.

The bass boost resulting from the feedback circuit from terminal 34*a* may thus be effectively cancelled or compensated by the bass degeneration introduced by the feedback circuit from terminal 34*b*. By employing variable resistor 42 the effect of condenser 40 may be altered in order to vary the amount of bass attenuation. When condenser 40 is completely shorted out, the feedback potential is made substantially flat across the audio range. Curve C illustrates the frequency response characteristic of the amplifying system when condenser 40 is shorted out and tap 13 is adjusted for maximum volume. Comparing curves C and B it will be noted that the response characteristic is relatively flat for maximum volume with the feedback circuit from terminal 34*a* alone or with the addition of the feedback circuit terminal 34*b* when condenser 40 is shorted out. Of course, the approximately six-decibel difference between curves C and B results from the additional attenuation introduced by the feedback circuit from terminal 34*b*.

However, unlike response characteristic B of the feedback circuit from terminal 34*a*, variations of potentiometer 42 do vary the frequency response characteristic of the system even for maximum volume. The feedback potential from terminal 34*b* has a definite effect on the operation of the amplifying system since it is not applied to the volume control potentiometer as is the case with the feedback potential from terminal 34*a*. Because of the independence of the additional feedback circuit from the volume control potentiometer, controlled degeneration is effective no matter what the level of the incoming signal may be. Dashed line C′ indicates the extent to which the response characteristic may be varied by varying tap 43 of potentiometer 42 to shunt the entire resistance across condenser 40. With maximum-volume setting of tap 13, any desired response between the solid and dashed curves C and C′ may be achieved by intermediate settings of tap 43.

Thus, it is possible with the present invention to lower or cut down on the bass response no matter where the volume control potentiometer is set. Of course, it is not possible to increase the bass response for maximum volume because of the inherent power output limitations of the amplifier and speaker. However, it is usually not desirable to boost the bass for maximum volume as at that point there will be adequate bass output for the normal ear.

Curve D represents the response characteristic achieved by both feedback circuits for the typical volume control setting indicated in Figure 1 and where condenser 40 is effectively shorted out. The feedback from terminal 34*b* is substantially flat over the audio range so that curve D has the same shape as curve A. As potentiometer 42 is varied to increase the effectiveness of condenser 40, the response characteristic may be varied to the extent illustrated by dashed curve D′ which represents the response when the full resistance of potentiometer 42 is placed across condenser 40. The bass response most pleasing to the listener may be established by varying tap 43 to establish a response characteristic somewhere between solid curve D and dashed curve D′.

It will be appreciated that the overall degeneration resulting from the additional feedback from terminal 34*b* is effective to prevent any regeneration that may be caused with the use of the feedback circuit from terminal 34*a* alone, without requiring a relative decrease in bass response.

The invention provides, therefore, signal-translating apparatus which may very advantageously be employed in high fidelity audio amplifying systems in order to permit a variation in the bass response for any incoming signal level.

While a particular embodiment of the invention has been shown and described, modifications may be made, and it is intended in the appended claims to cover all such modifications as may fall within the true spirit and scope of the invention.

I claim:

Signal-translating apparatus comprising: a signal source providing an audio signal having frequency components extending over a given audio range; a volume control potentiometer, having a variable tap, and a fixed resistor connected in series across said source; an amplifying device having first and second input terminals and an output terminal for amplifying said audio signal according to a substantially flat frequency response characteristic over said audio range; another amplifying device having an input circuit and an output circuit; means coupling said output terminal to the input circuit of said other amplifying device; means coupling the tap of said potentiometer to one of said input terminals; first feedback means for emphasizing the relatively low frequency components in said audio range with respect to the middle and relatively high frequency components in said audio range, said first feedback means including a series-connected condenser coupled from the output circuit of said other amplifying device to the junction between said fixed resistor and potentiometer for providing substantially degenerative feedback, varying with frequency, to effectively alter the frequency response characteristic of said first-mentioned amplifying device, said first feedback means subject to introducing undesired regeneration for certain of the low frequency components in said audio range; and second feedback means independent of said potentiometer for emphasizing the middle and relatively high frequency components in said audio range with respect to the relatively low frequency components and for effectively decreasing any undesired regeneration introduced by said first feedback means, said second feedback means including a shunt-connected parallel combination of a condenser and a bass tone control resistor coupled from the output circuit of said other amplifying device to one of said input terminals for providing substantially degenerative feedback, varying with frequency, to effectively alter said frequency response characteristic of said first-mentioned amplifying device, said bass tone control resistor being variable to control the low frequency response of said first-mentioned amplifying device for any setting of the tap of said volume control potentiometer.

References Cited in the file of this patent

UNITED STATES PATENTS

| | | |
|---|---|---|
| 1,914,629 | Aguirre | June 20, 1933 |
| 2,282,380 | Root | May 12, 1942 |
| 2,282,381 | Root | May 12, 1942 |
| 2,282,382 | Root | May 12, 1942 |
| 2,282,383 | Root | May 12, 1942 |
| 2,367,110 | Fayers | Jan. 9, 1945 |
| 2,374,071 | Barton | Apr. 17, 1945 |
| 2,752,432 | Richter | June 26, 1956 |